E. L. HEGARTY & H. L. MOODY.
FLAT IRON STOVE.
APPLICATION FILED NOV. 27, 1908.
920,569.
Patented May 4, 1909.
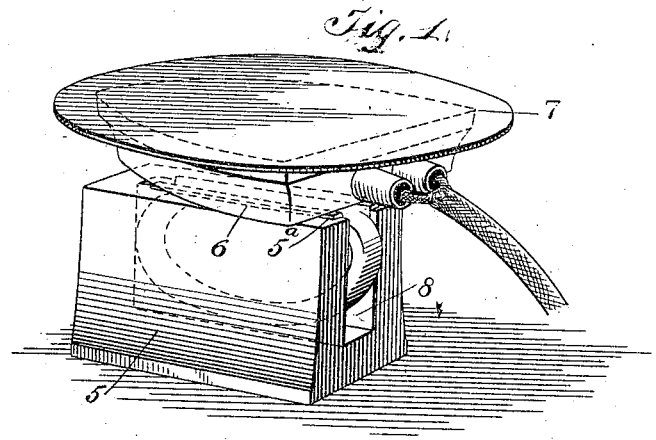
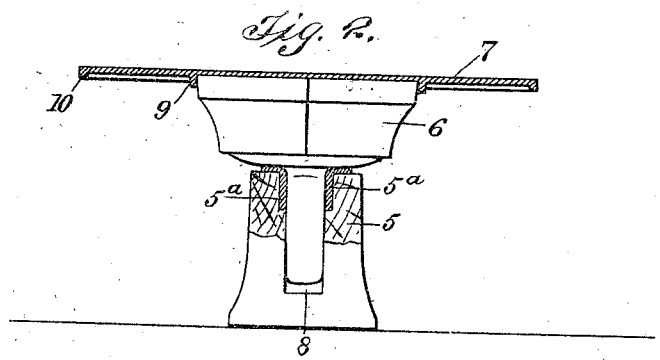
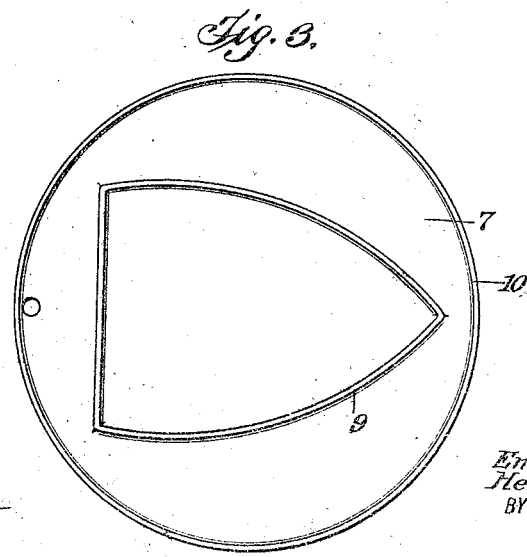
WITNESSES
INVENTORS
Emery L. Hegarty
Henry L. Moody
BY
ATTORNEYS

UNITED STATES PATENT OFFICE.

EMERY L. HEGARTY AND HENRY L. MOODY, OF WATERVILLE, MAINE.

FLAT-IRON STOVE.

No. 920,569.  Specification of Letters Patent.  Patented May 4, 1909.

Application filed November 27, 1908. Serial No. 464,730.

*To all whom it may concern:*

Be it known that we, EMERY L. HEGARTY and HENRY L. MOODY, citizens of the United States, and residents of Waterville, in the county of Kennebec and State of Maine, have invented a new and Improved Flat-Iron Stove, of which the following is a full, clear, and exact description.

The invention belongs to that class of stoves or heaters in which an inverted flat-iron, generally electrically heated, constitutes the heating element, and has for its purpose a holder which will firmly support any ordinary shaped iron in an inverted position, and a member for protecting the pressing face of the iron, extended beyond the edges thereof.

The invention may be defined as consisting of a slotted block, an inverted flat-iron seated on the block having its handle projecting into the slot, and an extended cooking or heating plate seating on and covering the pressing face of the iron.

Reference is to be had to the accompanying drawings forming a part of this specification, in which similar characters of reference indicate corresponding parts in all the views.

Figure 1 is a perspective view of a flat-iron heater or stove embodying our invention; Fig. 2 is an end view of the same showing the holder and heating plate in section; and Fig. 3 is an inverted plan of the heating plate.

The invention more specifically described consists of an iron-holder 5, an iron 6 and a heating plate 7. The holder 5 is in the form of a block having a central longitudinal slot or channel 8 which extends through one end and terminates short of the other end of the block. The bottom of the slot also terminates a substantial distance from the bottom face of the block. The base of the block is preferably of extended width, as best observed in Fig. 2, in order that the heater may not be easily toppled over but remain in stable equilibrium.

The block if made of wood, as shown, is provided with a fireproof facing 5ª at points where the heated portion of the iron contacts. The flat-iron 6, which is ordinarily electrically heated, is seated in an inverted position on the top of the block, with the handle thereof projecting into the slot and preventing the iron from shifting its position, one end of the handle bearing on the end wall of the slot, as shown in Fig. 1. The heating plate 7 seats on the pressing face of the iron and prevents the same from being roughened or otherwise marred when the stove is used for cooking purposes. The plate is provided on its under face with a depending flange 9 surrounding the center, and of a shape to fit over the iron and engage the same at the edges, the flange 9 not only preventing the plate from sliding but also serving in connection with a marginal flange 10 to strengthen the plate and prevent it from warping. The plate, in addition to protecting the pressing face of the iron extends over the heating surface thereof, which is obviously advantageous when the device is used for cooking purposes.

By reason of the particular form of holder 5, any ordinary form of electric iron may be used in connection with our invention; accordingly, any one in possession of such an iron may, with the addition of the holder 5 and plate 7, erect the complete stove.

Having thus described our invention, we claim as new and desire to secure by Letters Patent:

1. The combination of a block having a slot, an electric flat-iron seated in an inverted position on the upper face of the block, with the handle thereof projecting into said slot, and a heating plate seated on and covering the pressing face of the iron.

2. The combination of a block having a longitudinal slot passing through one end thereof and terminating short of the opposite end, an iron seated in an inverted position on the upper face of the block, with the handle thereof projecting into said slot and bearing against the end wall thereof, and a heating plate seated on and covering the pressing face of the iron and extended beyond the edges thereof.

3. A flat-iron heating plate for covering the pressing face of the iron, having a flange on its under side for engaging the iron at the edges.

4. A block for supporting a flat-iron in an inverted position, having a longitudinal slot to receive the handle of the iron, with the slot passing through one end of the block and terminating short of the other end of the block, and with the base of the block of extended width.

In testimony whereof we have signed our names to this specification in the presence of two subscribing witnesses.

EMERY L. HEGARTY.
HENRY L. MOODY.

Witnesses:
CHARLES F. JOHNSON,
JENNIE HAMLIN WAITE.